United States Patent
Reynolds et al.

(10) Patent No.: US 7,421,389 B2
(45) Date of Patent: Sep. 2, 2008

(54) SYSTEM AND METHOD FOR REMOTE SPEECH RECOGNITION

(75) Inventors: Douglas F. Reynolds, Austin, TX (US); Benjamin Anthony Knott, Round Rock, TX (US); Robert Randal Bushey, Cedar Park, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 995 days.

(21) Appl. No.: 10/293,104

(22) Filed: Nov. 13, 2002

(65) Prior Publication Data

US 2004/0093211 A1 May 13, 2004

(51) Int. Cl.
*G10L 15/00* (2006.01)
(52) U.S. Cl. .................. 704/235; 704/275; 379/88.01
(58) Field of Classification Search ................ 704/235, 704/275; 379/88.01
See application file for complete search history.

(56) References Cited

U.S. PATENT DOCUMENTS

| | | | |
|---|---|---|---|
| 5,526,413 A | 6/1996 | Cheston, III et al. | 379/201 |
| 5,594,789 A | 1/1997 | Seazholtz et al. | 379/207 |
| 5,771,279 A | 6/1998 | Cheston, III et al. | 379/93.17 |
| 5,774,860 A | 6/1998 | Bayya et al. | 704/275 |
| 5,790,173 A | 8/1998 | Strauss et al. | 348/7 |
| 5,915,008 A | 6/1999 | Dulman | 379/201 |
| 6,118,985 A * | 9/2000 | Kawakyu et al. | 455/78 |
| 6,188,985 B1 * | 2/2001 | Thrift et al. | 704/275 |
| 6,269,336 B1 * | 7/2001 | Ladd et al. | 704/270 |
| 6,308,158 B1 * | 10/2001 | Kuhnen et al. | 704/275 |
| 6,442,242 B1 | 8/2002 | McAllister et al. | 379/67.1 |
| 6,662,163 B1 * | 12/2003 | Albayrak et al. | 704/275 |
| 6,865,536 B2 * | 3/2005 | Jochumson | 704/270.1 |
| 6,996,227 B2 * | 2/2006 | Albal et al. | 379/355.05 |

* cited by examiner

*Primary Examiner*—Daniel D Abebe
(74) *Attorney, Agent, or Firm*—Jackson Walker L.L.P.

(57) ABSTRACT

A system and method for remote speech recognition includes one or more customer premise equipment, a speech engine, and a communication engine. The customer premise equipment interfaces with a host from which the customer premise equipment is remotely located. The speech engine, remotely located from the host, recognizes a plurality of speech spoken by a user of the customer premise equipment and translates the speech into the language of the host. The speech engine further converts the recognized speech into one or more text data packets where the text data packets include the recognized speech as data instead of voice. The communication engine encrypts the text data packets and transmits the text data packets to the host. Transmitting data instead of voice to the host reduces the computational demands on the host. Additionally, the communication engine receives a plurality of information from the host.

29 Claims, 3 Drawing Sheets

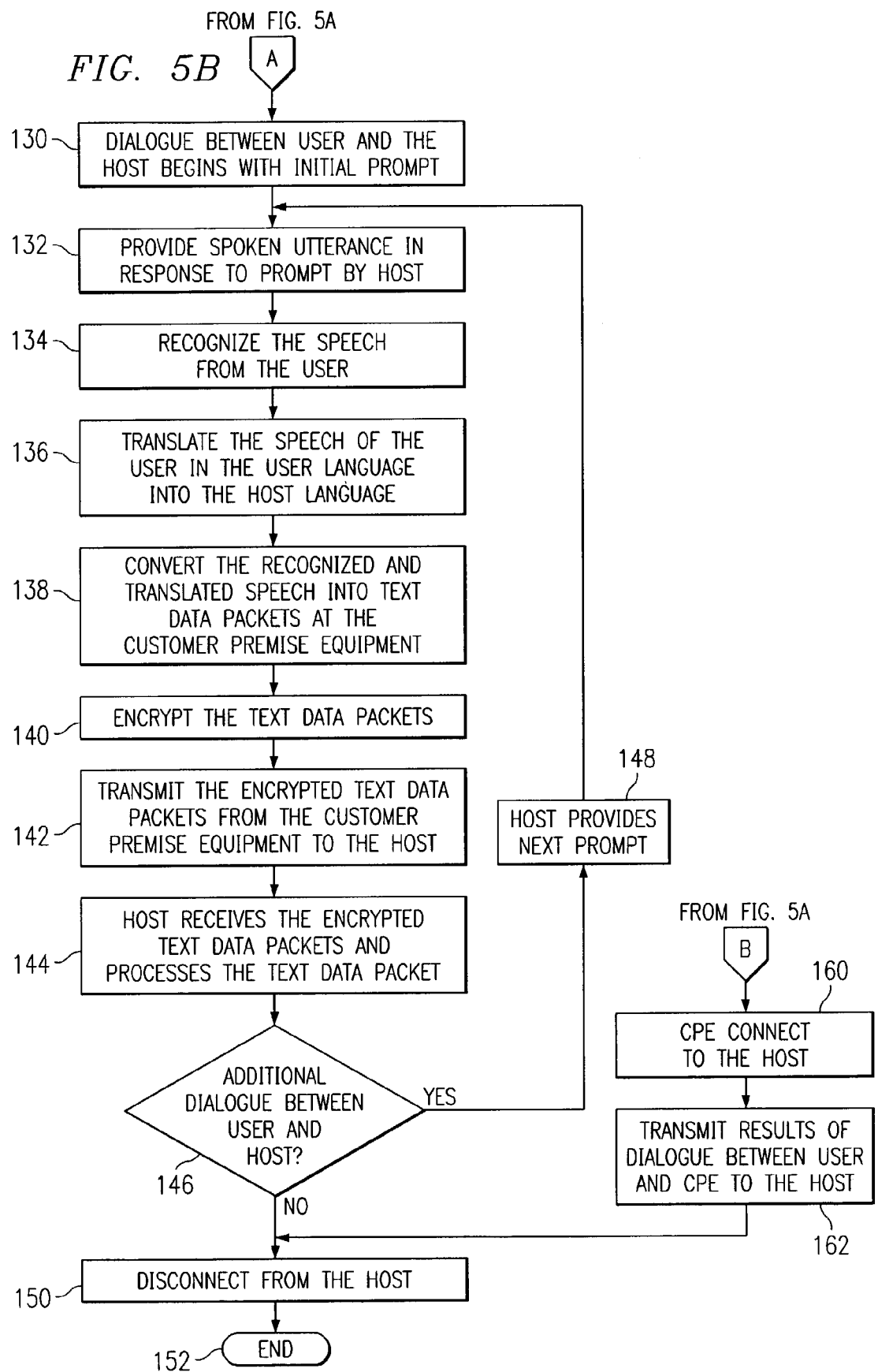

SYSTEM AND METHOD FOR REMOTE SPEECH RECOGNITION

TECHNICAL FIELD OF THE INVENTION

The present invention relates generally to telephony communications, and more specifically relates to a system and method for remote speech recognition.

BACKGROUND OF THE INVENTION

Customers call a company service call center with problems or questions about a product or service or to alter their existing service. When calling, customers typically speak to customer service representatives (CSR) or interact with self-service interactive voice response (SS-IVR) systems. Because of the cost associated with CSR time, companies are automating or partially automating the customer service functions and moving away from live CSRs. These automated systems that provide customer service functions without CSR contact have become important to many companies as a cost savings measure and increasingly popular with customers. As the use of SS-IVRs increases, SS-IVR technology has allowed for a more human like interaction between the customer and the SS-IVR through the use of speech recognition technology. Speech recognition allows the customers to speak responses to system prompts instead of pressing keys on the telephone keypad to respond. However, speech recognition is computationally demanding which can result in excessively long response times for the customers. Also, speech technology requires large capital expenditures on hardware at the company service call center. Because of the high volume of calls received at service centers and the high operating demands associated with using speech recognition, speech recognition technology is becoming a large capital intensive technology to implement.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
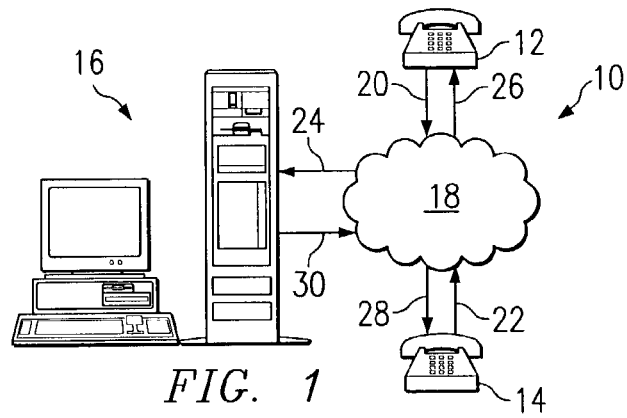
FIG. 1 depicts a schematic diagram of an example embodiment of a system for remote speech recognition.

Preferred embodiments of the present invention are illustrated in the figures, like reference numbers being used to refer to like and corresponding parts of the various drawings.

When calling a company service call center with problems or questions, customers or callers typically interact with a live customer service representative (CSR) or an automated system utilizing self-service interactive voice response (SS-IVR) systems. SS-IVRs are generally used in businesses to handle calls that may not require a human CSR to assist the customer. Through improved design and expanded use, customers have become more accepting of SS-IVR systems and, therefore, SS-IVR systems have enjoyed greater widespread use. Use of SS-IVR systems is increasing due to the growing popularity of SS-IVR systems with the customers and the cost savings resulting from the reduction in CSR staff levels necessary to interact with the customers.

The typical IVR system is a series of dialog exchanges between the caller and the SS-IVR system. The SS-IVR system plays system prompts to the caller that the caller then responds to. For example, the SS-IVR system may ask the caller for the caller's account number or the purpose of the call. The caller may respond by using the keys on the telephone keypad for touch tone input. For example, if the SS-IVR system asks the caller for the caller's account number, the caller responds by using the keys on the telephone keypad to enter the caller's account number. There are situations where entering responses via the keys on the telephone keypad is cumbersome for the caller such as while driving a vehicle. Also, there are inquires for which the keys on the telephone keypad cannot be effectively used to provide a response such as entering the time and date. For these type situations, SS-IVR systems may utilize speech recognition technology so that the caller may speak the response instead of pushing keys on the telephone keypad. The SS-IVR system recognizes the speech of the caller and continues with the next prompt.

Because callers, in certain situations like driving, prefer speaking their responses instead of pushing keys on the telephone keypad, speech recognition technology is becoming important technology in providing an interface between callers and an automated system. Speech recognition technology allows for a broader range of self-service applications to become automated. For example, asking a caller for their home address is a difficult and frustrating procedure for the caller using touch tone input. But with speech recognition, the caller can speak their home address (both numbers and street name) and the address would be recognized with speech recognition technology. In addition, speech recognition technology typically increases caller satisfaction because the callers generally prefer to speak their responses (callers find it easier) instead of taking the time to key in each answer using the telephone keypad.

The development costs and capital equipment costs for speech recognition technology is higher than that of touch tone technology input interfaces. Speech recognition technology requires speech ports along with hosts that provide the necessary computation for speech recognition, text to speech analysis, natural language understanding (NLU), and dialog management. The development costs include programming the applications to accept speech input and developing grammars for the speech recognizer. Speech recognition technology also requires on-going tuning of the speech recognizer in order to improve performance after deployment of the IVR using speech recognition. Speech recognition is computationally demanding and therefore requires expensive processing hardware, such as an automated speech recognizer (ASR), speech ports, grammar development, and dialog management development, to be included at a company's service call center in order for speech recognition to correctly function.

Because any person can call the customer service call center, the IVRs using speech recognition must be speaker independent and include the resources to handle different languages, accents, dialects, and regional terms. For example, a call center serving Texas utilizing speech recognition would need to be equipped to recognize both English and Spanish in order to serve the largest number of customers. Because of the variety of languages, speech ports may have to receive and recognize more than one language. This multiple language requirement is another reason that speech technology is more expensive than touch tone technology whose ports only have to recognize key stroke information. In addition, the speech recognizer must be available for a high volume of calls and, where license fees are based on number of calls received, the license fees can quickly escalate. Recognizing speech generally takes a longer time than recognizing touch tone input so that with a high volume of calls and shared resources at the customer service call center, response times to the callers can be excessive which directly and negatively affects customer satisfaction levels.

Because of the demanding processing required, the higher equipment costs, and the excessive response and wait times for the callers, the benefits of interacting with an automated system utilizing speech recognition versus live CSRs are decreasing. In addition, speech recognition technology requires a much larger bandwidth in order to transmit callers' verbal responses over the network. This increased bandwidth requirement adds to the capital costs of speech recognition technology. Also, automated systems utilizing speech recognition technology with excessive response times results in lower customer satisfaction.

By contrast, the example embodiment described herein allows for remote speech recognition. Additionally, the example embodiment allows for the removal of the speech recognition processing from the customer service call center to each individual caller so that each caller location has an individualized speech recognizer. These speech recognizers can be customized to suit the individual characteristics of each caller so that the customer service call centers are no longer required to understand numerous languages and dialects. Money is saved because less resources and processing power is required at the customer service call centers to recognize the speech of the callers and the network is required to have less bandwidth available. Customer satisfaction levels increase because of decreased response due to less demand on the customer service call center's resources.

Referring now to FIG. 1, a schematic diagram of an example embodiment of a system for remote speech recognition is depicted. Interface system 10 includes two customer premise equipment 12 and 14 and host 16 with customer premise equipment 12 and 14 in communication with host 16 via network 18. Customer premise equipment (CPE), also known as subscriber equipment, include any equipment that is connected to a telecommunications network and located at a customer's site. CPEs 12 and 14 may be telephones, 56 k modems, cable modems, ADSL modems, phone sets, fax equipment, answering machines, set-top box, POS (point-of-sale) equipment, PBX (private branch exchange) systems, personal computers, laptop computers, personal digital assistants (PDAs), SDRs, other nascent technologies, or any other appropriate type or combination of communication equipment installed at a customer's or caller's site. CPEs 12 and 14 may be equipped for connectivity to wireless or wireline networks, for example via a public switched telephone network (PSTN), digital subscriber lines (DSLs), cable television (CATV) lines, or any other appropriate communications network. In the example embodiment of FIG. 1, CPEs 12 and 14 are shown as telephones but in alternate embodiments may be any other appropriate type of customer premise equipment.

CPEs 12 and 14 are located at the customer's premise. The customer's premise may include a home, business, office, or any other appropriate location where a customer may desire telecommunications services. Host 16 is remotely located from CPEs 12 and 14 and typically within a company's customer service or call center which may be in the same or different geographic location as CPEs 12 and 14. The customers or callers and CPEs 12 and 14 interface with host 16 and host 16 interfaces with CPEs 12 and 14 through network 18. Network 18 may be a public switched telephone network, the Internet, a wireless network, or any other appropriate type of communication network. Although only one host 16 is shown in FIG. 1, in alternate embodiments host 16 may serve alone or in conjunction with additional hosts located in the same customer service or call center as host 16 or in a customer service or call center remotely located from host 16. In addition, although two CPEs 12 and 14 are shown in FIG. 1, in alternate embodiments interface system 10 may include more than two or less than two customer premise equipment.

Figure 2:
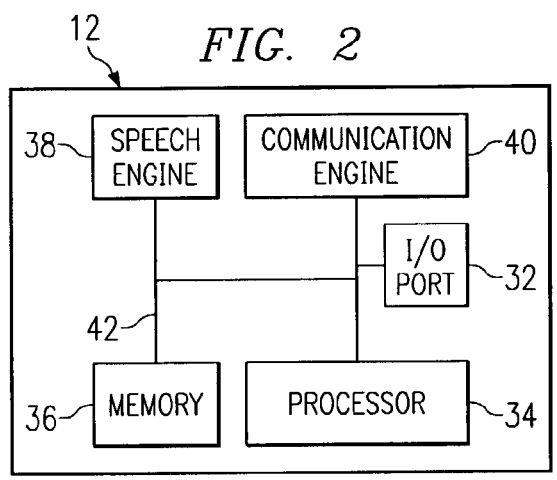
FIG. 2 illustrates a block diagram of an example configuration of customer premise equipment.

FIG. 2 illustrates a block diagram of CPEs 12 in greater detail. In the example embodiment, CPE 12 includes processing resources. Those processing resources may include, for example, hardware components such as input/output (I/O) port 32 for network communications, processing circuitry such as processor 34, and one or more memory storage components 36 such as random access memory (RAM), non-volatile RAM (NVRAM), or any other appropriate memory type. Memory 36 may be used to store instructions as well as other types of data, such as calendar data, configuration data, user data, and any other appropriate data type. When CPE 12 receives information from host 16, that information may also be stored in memory 36. CPE 12 further includes speech engine 38 and communication engine 40, which are executable by processor 34 through bus 42. All of the above components may work together via bus 42 to provide the desired functionality of CPE 12.

In the embodiment shown in FIG. 2, speech engine 38 and communication engine 40 are located remote from host 16 and within CPE 12. In alternate embodiments, speech engine 38 and communication engine 40 may be remotely located from CPE 12 as well as host 16. For instance, speech engine 38 and communication engine 40 may be integrated access devices (IAD) which are separate devices not physically integrated into CPE 12. For example, speech engine 38 may be located in a box on an exterior wall of a building where CPE 12 is located. Such a location on an exterior wall may allow speech engine 38 to interact with all the CPEs located within the building resulting in lower equipment and operating costs because only one speech engine would be required for the plurality of CPEs located within the building versus requiring a separate speech engine for each CPE within the building.

Figure 3:
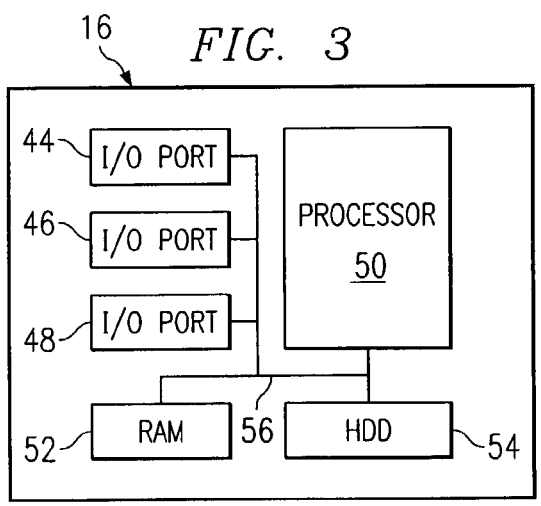
FIG. 3 depicts a block diagram of an example host.

FIG. 3 depicts a block diagram of host 16 in greater detail. In the example embodiment, host 16 may include respective software components and hardware components, such as processor 50, memory 52, input/output ports 44, 46, and 48, hard disk drive (HDD) 54, and those components may work together via bus 56 to provide the desired functionality. The various hardware and software components may also be referred to as processing resources. Host 16 may be a personal computer, a server, an interactive voice response (IVR) or voice response unit, or any other appropriate computing device operable to communicate with CPEs 12 and 14. HDD 54 may include information and software programs, such as grammars to aid in speech recognition, menu hierarchies, dialog management aides, and any other appropriate downloadable software or information that can be downloaded from host 16 to CPEs 12 and 14 and utilized by speech engine 38 and communication engine 40 in remotely recognizing speech. Host 16 utilizes I/O ports 44, 46, and 48 to communicate with CPEs 12 and 14 and allows host 16 to communicate with multiple CPEs simultaneously. Although three I/O ports are shown in FIG. 3, in alternate embodiments there may be more than three or less than three I/O ports.

Figure 4:
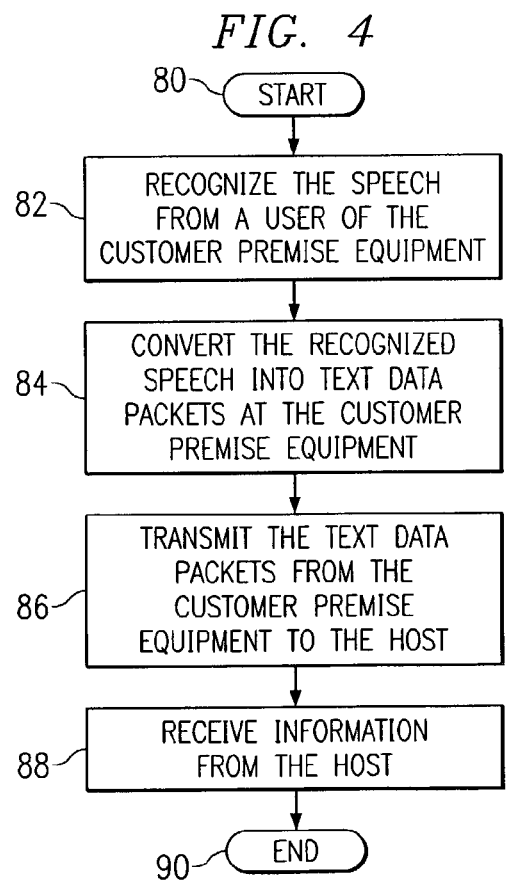
FIG. 4 illustrates a flowchart of an example embodiment of a method for remote speech recognition.

FIG. 4 illustrates a flow diagram of one embodiment of a method for remote speech recognition. Interface system 10 allows for the remote or distributed recognition of the speech of a customer or a user of CPE 12 or 14 at CPE 12 and 14 instead of at host 16. The method begins at step 80 and at step 82 speech engine 38 recognizes the speech of the user of CPE 12. The user is providing speech or a verbal utterance in response to a prompt. At step 84, speech engine 38 takes the recognized speech of the user and converts the speech into one or more text data packets. Communication engine 40 retrieves the text data packets from speech engine 38 and transmits the text data packets across network 18 to one of the I/O ports 44, 46, or 48 of host 16 at step 86. After host 16 receives the text data packets from CPE 12, at step 88 CPE 12 receives information back from host 16 where the information type is dependent on what the user has stated in response to the previous prompts. For example, if the initial prompt asked the user for the user's address, the user speaks the address and the information received by CPE 12 from host 16 may be a confirmation prompt confirming the address information the user previously provided. The method ends at step 90.

Figure 5A:
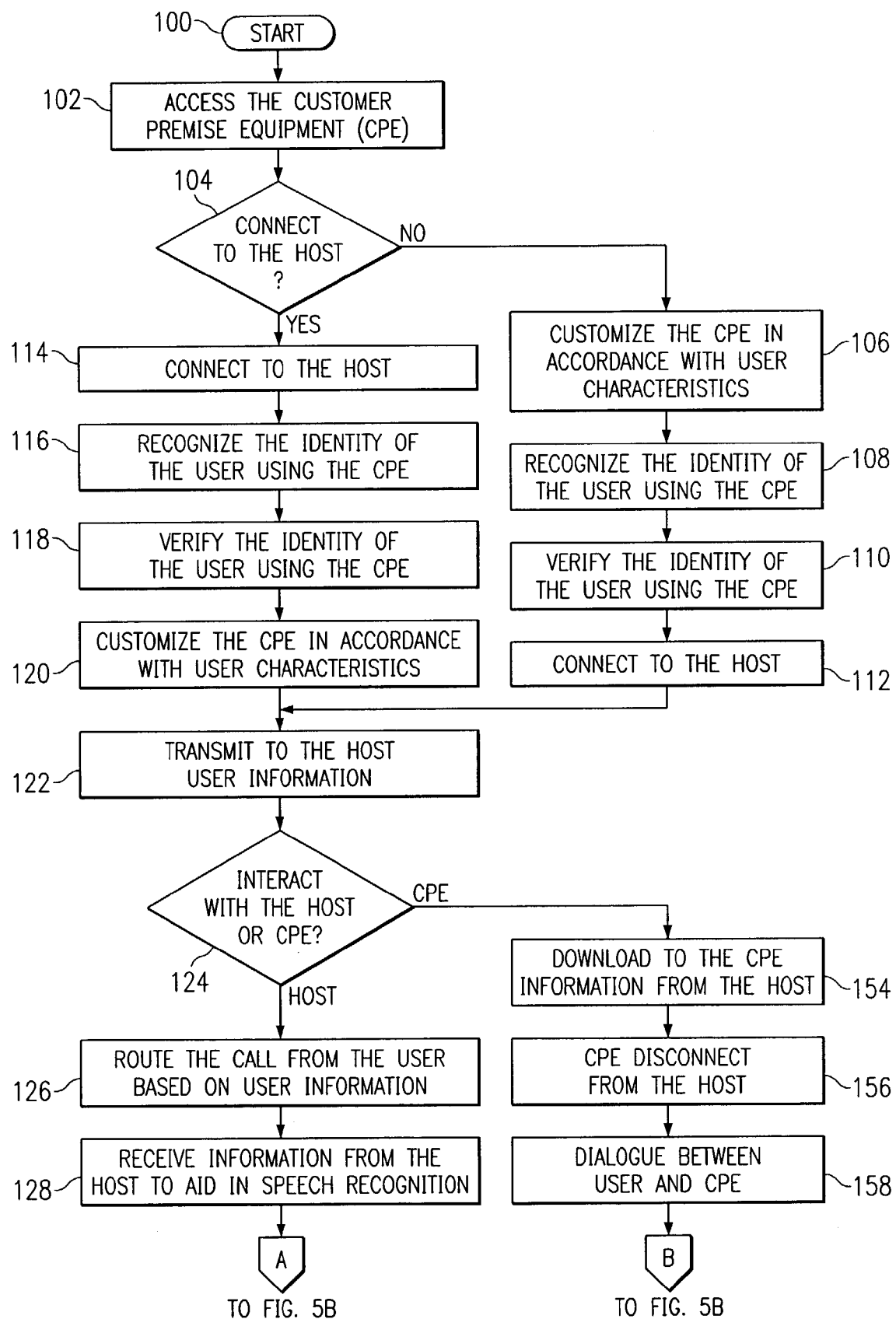
FIG. 5 depicts a flowchart of an example embodiment of a method for remote speech recognition.

FIG. 5 depicts a flowchart of an example embodiment of a method for remote speech recognition. The method begins at step 100 and at step 102 a user accesses CPE 12. Before accessing CPE 12, CPE 12 needs to be correctly installed at the location of the user which may be the user's home or office. Alternatively, CPE 12 may be a mobile device and therefore not require installation at a fixed location. The user needs not be at the same location as CPE 12 in order to access CPE 12 because the user can remotely access CPE 12. For example, CPE 12 may be located at the user's house. The user can call CPE 12 from a remote location such as a pay phone or mobile phone, provide a passcode, and remotely access CPE 12 in much the same way that a user can remotely access a home telephone answering machine or voicemail.

Before the user can fully take advantage of all the features of CPE 12, CPE 12 must be customized or tailored to the user. CPE 12 including speech engine 38 can be customized to the characteristics of each user of CPE 12 for such characteristics as language, dialect, regional terms, sex, or any other appropriate user characteristic. For instance, a user of CPE 12 may be located in southern Texas and speak Spanish. CPE 12 and speech engine 38 need to be customized to accept and recognize Spanish instead of English as the language of the user. In addition, a female user may wish to hear a female voice when interacting with an automated system and therefore CPE 12 would need to be customized to provide a female voice when playing menu prompts. Also, CPE 12 may be installed in a house or office where more than one user uses CPE 12. In such instances, CPE 12 needs to be customized for each user of CPE 12.

The user has optimizing options with respect to customizing CPE 12. The user can manually customize CPE 12 before ever connecting with host 16. If a user does not want to initially spend the time manually customizing CPE 12, CPE 12 and speech engine 38 can eavesdrop on the user interacting with CPE 12 and host 16, gradually learn the characteristics of the user, and over time gradually customize CPE 12 based on the user characteristics. In alternate embodiments, the user may not have a choice as to a method for customizing CPE 12 and may either have to manually customize CPE 12 before ever using CPE 12 and connecting to host 16 or gradually customize CPE 12 through eavesdropping. In addition, the customization of CPE 12 may also be a combination of both manual customization and gradual customization through eavesdropping. For instance, the user may initially customize CPE 12 with the user's language and then connect to host 16 where as the user interacts with CPE 12 and host 16 further customization occurs based on the user's interaction and speech. If at step 104 the user wants to manually customize CPE 12 before using CPE 12 and connecting to host 16, then the method continues to step 106 where the user begins the manual customization process. If the user does not want to spend the time to initially and manually customize CPE 12, then the process continues to step 114 where CPE 12 connects with host 16.

For manual customization, at step 106 the user customizes CPE 12 in accordance with one or more of the user's characteristics. The user may provide to CPE 12 the user's telephone number, geographic location, gender, language preference, any language dialects, any regional terms, voice codes or passwords for user identification, or any other appropriate user characteristics. For example, an Italian immigrant living in Philadelphia may customize CPE 12 with Italian as the preferred language, the telephone number for where CPE 12 is installed, and the account number for the service for CPE 12. CPE 12 stores the user characteristics in memory 36 so that the various components of CPE 12 including speech engine 38 may have access to the user characteristics. Once the user has finished customizing CPE 12, the user does not need to customize CPE 12 again unless the user characteristics change.

In addition to customizing CPE 12, CPE 12 must also be set up to recognize and identify the user of CPE 12. Before the user can make any changes to an account using CPE 12 or access host 16, at step 108 speech engine 38 must recognize the identity of the user and verifies the identity of the user at step 110. Speech engine 38 recognizes the user utilizing information provided by the user when initializing CPE 12. Such information may include a password provided by the user when the user first installed CPE 12, biometrics voice analysis information, or any other appropriate identification means. For example, if the user provided a password for identification when installing CPE 12, the password is stored in memory 36 or in memory 52 or HDD 54 of host 16. When the user accesses CPE 12, speech engine 38 prompts the user for the password at step 108. The user speaks the password, speech engine 38 recognizes the speech of the using containing the password and compares the password provided by the user with the password provided during installation. If the previously provided password is stored in memory 36, then speech engine 38 accesses memory 36, retrieves the previously provided password, compares the two passwords, and if the two passwords match, verifies the identity of the password. If the previously provided password is stored at host 16, then CPE 12 connects to host 16 through communication engine 40, I/O port 32 and one of I/O ports 44, 46, or 48 to access and retrieve the previously provided password stored at host 16.

Speech engine 38 may also use biometrics to recognize and verify the identify of the user. When installing CPE 12, the user speaks her full name and the spoken full name is recorded and stored in memory 36 or memory 52 or HDD 54 of host 16. When the user accesses CPE 12, speech engine 38 prompts the user to speak her full name. The user speaks her full name and using biometrics analysis, speech engine 38 compares the user's currently spoken name with the previously spoken name stored in memory 36 or at host 16. As with password verification, if the spoken name is stored at host 16, CPE 12 connects to host 16 in order to access and retrieve the previously spoken name for comparison and verification. In alternate embodiments, user identity verification may be performed by to a third party verification service in order to provide an additional level of security. Once the user's identity has been correctly recognized and verified, communication engine 40 connects to host 16 and the process continues to step 122.

If at step 104 the user decides to gradually customize CPE 12 over time through eavesdropping, then at step 114 communication engine 40 utilizing I/O port 32 connects to host 16. CPE 12 and communication engine 40 utilize Voice over Internet Protocol (VoIP) to communicate with host 16 and transmit and receive information from host 16. At steps 116 and 118 the user's identity is recognized and verified as described above with respect to steps 108 and 110. As the user interacts with CPE 12 and host 16, CPE 12 and speech engine 38 are learning the user characteristics based on the language the user speaks and the words the user speaks in order to customize CPE 12 at step 120. Gradual customization of CPE 12 continues as long as the user interacts with CPE 12 and host 16 until CPE 12 is completely initially customized. Continual monitoring of the interaction between the user, CPE 12, and host 16 may continue thereafter so that CPE 12 may be customized to take into account changes in the characteristics of the user.

Once speech engine 38 recognizes and verifies the user's identity, at step 122 communication engine 40 transmits user information stored in memory 36 to host 16. The user information transmitted may include the name of the user, account numbers, recent account activity, and any other appropriate user information. CPE 12 and communication engine 40 transmit the user information to host 16 along paths 20 and 24 via network 18 to one of I/O ports 44, 46, or 48. CPE 14 transmits user information to host 16 along paths 22 and 24 via network 18 to one of the I/O ports 44, 46, or 48 of host 16.

Once host 16 has received the user information, at step 124 host 16 and CPE 12 must determine if the user interacts with CPE 12 alone or a combination of CPE 12 and host 16. Because CPE 12 includes both memory and speech engine 38, CPE 12 has the ability to interact with the user with little or no assistance from host 16. For instance, host 16 may download along paths 30 and 26 via network 18 to memory 36 of CPE 12 a menu hierarchy of prompts and then disconnect from CPE 12 so that the user interacts with CPE 12 and not host 16 while traversing the menu prompts thereby reducing the traffic or load on host 16.

If at step 124 the user is to interact with host 16, then at step 126 host 16 routes the user's call based on user information. For instance, a user that is a good customer that consistently pays bills on time (which is evidenced by the user's account information) may be routed differently and offered a different set of menu prompts than a user who is behind on bill payment. Host 16 may also utilize the user information such as account information to speculate as to the purpose of the user's call which aids in the routing of the call. For instance, when the user and CPE 12 connect to host 16 and host 16 accesses the user's account information, host 16 examines the account information for any recent activity. If the user changed his long distance provider two weeks ago, host 16 may speculate that the user is calling about the change in long distance provider and prompt the user with "Are you calling about your recent change in long distance service?" as the initial prompt.

In addition to routing the call from the user, at step 128 host 16 downloads to memory 36 of CPE 12 via paths 30 and 26 aides, information, and software to aid speech engine 38 in recognizing the speech of the user. Such aides may include grammars and dialog management aides customized to the characteristics of the user of CPE 12. For instance, the user information may indicate that the user speaks only Spanish. Therefore, host 16 may download to CPE 12 information to assist speech engine 38 in recognition of the speech of the user.

At step 130 the dialog between the user and host 16 begins with host 16 providing a prompt and the user providing a spoken response to the prompt at step 132. At step 134, speech engine 38 recognizes the user's speech instead of the user's speech being recognized at host 16. CPE 12 includes an automated speech recognizer within speech engine 38. When the user speaks a response into CPE 12 to the prompt provided by host 16, speech engine 38 recognizes the speech of the user. Speech engine 38 is not affected by the language of the user because speech engine 38 is customized to accept and recognize the preferred language of the user as described above. So the fact that the user speaks French and host 16 operates only in English does not affect the recognition of speech at CPE 12 because CPE 12 has been customized to recognize French.

Once speech engine 38 correctly recognizes the speech of the user, speech engine 38 determines if the language of the user or the user language is the same as the host language. The host language is the language that host 16 operates in and understands. If the user language is not the same as the host language, then at step 136 speech engine 38 translates the user language into the host language. For example, host 16 may be located in a call center in the United States. Because host 16 is located within the United States, host 16 is programmed to accept and operate in English and therefore English is the host language. But many people living in the United States speak other languages besides English. Therefore, CPEs are customized to interact with users in their natural or preferred languages and then convert that language into the host language, here English. For instance, for a Spanish speaking user, the menu prompts play in Spanish, speech engine 38 recognizes the Spanish spoken by the user, and speech engine 38 translates the Spanish into English, here the host language.

The ability of speech engine 38 to recognize different languages and translate the languages into the host language allows host 16 to only have to process one language (the host language) which results in a decrease in the computational power required by host 16 and a decrease in the number of required speech ports. For example, the user may speak Spanish and host 16 has a host language of English. Host 16 through CPE 12 prompts the user for the user's account number. The user responds, "Dos, Seis, Cinco, Ocho, Tres, Siete, Cuarto." Because speech engine 38 has been customized to recognize Spanish, speech engine 38 recognizes the numbers spoken by the user in Spanish and translates the numbers into English resulting in "Two, Six, Five, Eight, Three, Seven, Four."

Once speech engine 38 recognizes the user's response and translated the spoken response into the host language, at step 138 speech engine 38 converts the spoken response into one more text data packets so that the spoken responses are represented as data instead of voice. The text data packets include the speech recognition results from speech engine 38. Communication engine 40 encrypts the text data packets at step 140 and transmits the encrypted text data packets to host 16 along paths 20 and 24 at step 142. Because text data packets are being sent instead of voice and the text data packets are all in the host language, fewer speech ports are required at host 16. Less processing power is required at host 16 because processing text is less data intensive than processing voice which results in reduced response times between prompts and responses.

When host 16 receives the encrypted text data packets at step 144, host 16 decrypts the text data packets and processes the text data packets for natural language understanding and dialog management. With the recognition of speech occurring at CPE 12 and the responses transmitted to host 16 as text data packets already recognized instead of voice to be recognized at host 16, a considerable portion of the processing burden is removed from host 16 (a company's resource) to remote CPEs whether those CPEs be wireless, home, or PC based. This reduces the user's burden of navigating the automated system's menu hierarchy by reducing the navigation overhead and menu structure that is present in current touch tone IVRs. The customizing of CPE 12 allows each user to speak their preferred language or dialect while decreasing the load on host 16.

Once host 16 has received the recognized spoken response as a text data packet and processed the text data packet, at step 146 CPE 12 and host 16 determine if there is additional dialog that needs to occur between the user and host 16. If there is additional dialog, then at step 148 host 16 provides the next prompt and the process returns to step 132 where steps 132 through 148 are repeated until there are no additional prompts at step 146. When there are no additional prompts at step 146, the user has finished interacting with host 16. CPE 12 disconnects from host 16 at step 150 and the process ends at step 152.

Demands on host 16 are further reduced when the user interacts with CPE 12 instead of host 16 at step 124. At step 154, host 16 downloads to memory 36 of CPE 12 via paths 30 and 26 a complete menu hierarchy of prompts. CPE 12 then disconnects from host 16 at step 156. For example, at step 124 the host may prompt the user by asking if the user is calling about adding an additional service or feature to the user's telephone. If the user responds yes, then host 16 downloads to memory 36 of CPE 12 a menu hierarchy of prompts for adding a new service or feature. Once the menu hierarchy is downloaded, CPE 12 disconnects from host 16 and at step 158 the user interacts with CPE 12 going through the downloaded menu hierarchy until the user locates the desired service to add, such as call forwarding. Once the user selects call forwarding as the desired service, CPE 12 saves this preference and connects to host 16 at step 160. At step 162 communication engine 40 transmits to host 16 that call forwarding should be added to the user's telephone service and then disconnects from host 16 at step 150. Because the menu hierarchy of prompts is downloaded to CPE 12, the user interacts with CPE 12 and does not interact with host 16 thereby reducing the traffic and demands on host 16.

In addition, one of ordinary skill will appreciate that alternative embodiments could be deployed with many variations in the number and type of devices in the system, the communication protocols, the system topology, the distribution of various software and data components among the hardware systems in the network, and myriad other details without departing from the present invention. For instance, although only one host is illustrated in the example embodiment, in alternative embodiments, additional hosts may be used.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, data processing systems incorporating the invention may include personal computers, mini computers, mainframe computers, distributed computing systems, and other suitable devices.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such as wires, optical fibers, microwaves, radio waves, and other electromagnetic or optical carriers.

Although the present invention has been described in detail, it should be understood that various changes, substitutions and alterations can be made hereto without the parting from the spirit and scope of the invention as defined by the appended claims.

What is claimed is:

1. A system for remote speech recognition utilizing voice over Internet Protocol, the system comprising:
   one or more customer premise equipment remote from a host, the customer premise equipment comprising a telephone operable to interface with the host;
   a speech recognition engine disposed within the customer premise equipment, the speech engine operable to be customized based on one or more characteristics of a user of the customer premise equipment;
   a communication engine associated with the speech engine and located within the customer premise equipment;
   the speech engine operable to recognize and verify an identify of the user of the customer premise equipment;
   the speech recognition engine further operable to recognize a plurality of speech from the user;
   the speech engine further operable to translate the speech of the user into the host language;
   the speech engine further operable to convert the recognized and translated speech into one or more text data packets;
   the communication engine operable to encrypt the text data packets;
   the communication engine further operable to transmit the encrypted text data packets from the customer premise equipment to the host;
   the host operable to receive the encrypted text data packets and route the encrypted text data packets based on a plurality of user information; and
   the host further operable to download to the customer premise equipment a plurality of information.

2. A method for remote speech recognition, the method comprising:
   recognizing a plurality of speech from a user of a customer premise equipment, wherein the customer premise equipment comprises equipment selected from the group consisting of telephones, 56 k modems, cable modems, ADSL modems, phone sets, fax equipment, answering machines, set-top box, POS (point-of-sale) equipment, and PBX (private branch exchange) systems;
   customizing the customer premise equipment utilizing one or more characteristics of the user including eavesdropping on the user interacting with the host and the customer premise equipment in order to obtain one or more of the characteristics of the user;
   converting the recognized speech into one or more text data packets at the customer premise equipment;
   transmitting the text data packets from the customer premise equipment to a host; and receiving a plurality of information from the host based on the speech of the user.

3. A method for remote speech recognition, the method comprising:
recognizing a plurality of speech from a user of a customer premise equipment, wherein the customer premise equipment comprises equipment selected from the group consisting of telephones, 56 k modems, cable modems, ADSL modems, phone sets, fax equipment answering machines, set-top box, POS (point-of-sale) equipment, and PBX (private branch exchange) systems;
customizing the customer premise equipment utilizing one or more characteristics of the user including initializing the customer premise equipment with the characteristics of the user;
converting the recognized speech into one or more text data packets at the customer premise equipment;
transmitting the text data packets from the customer premise equipment to a host; and
receiving a plurality of information from the host based on the speech of the user.

4. The method of claim 3 wherein receiving a plurality of information from the host comprises downloading to the customer premise equipment a menu hierarchy.

5. The method of claim 3 wherein receiving a plurality of information from the host comprises downloading to the customer premise equipment one or more speech recognition aides.

6. The method of claim 3 wherein recognizing the speech of the user of the customer premise equipment comprises recognizing the speech at the customer premise equipment and not at the host.

7. The method of claim 3 further comprising:
recognizing the identity of the user of the customer premise equipment; and
verifying the identify of the user of the customer premise equipment.

8. The method of claim 7 further comprising transmitting to the host a plurality of user information once the identity of the user has been verified.

9. The method of claim 8 further comprising utilizing biometrics to recognize and verify the identity of the user of the customer premise equipment.

10. The method of claim 8 wherein verifying the identity of the user of the customer premise equipment comprises:
receiving a password from the user; and
comparing the password with a previously provided password.

11. The method of claim 3 further comprising routing a call from the customer premise equipment based on a plurality of user information.

12. The method of claim 3 wherein recognizing the speech of the user of the customer premise equipment comprises translating the user speech from a user language into a host language.

13. The method of claim 3 wherein transmitting the text data packets to the host and receiving the information from the host comprises transmitting and receiving utilizing voice over Internet Protocol.

14. A method for remote speech recognition, the method comprising:
recognizing a plurality of speech from a user of a customer premise equipment, wherein the customer premise equipment comprises equipment selected from the group consisting of telephones, 56 k modems, cable modems, ADSL modems, phone sets, fax equipment, answering machines, set-top box, POS (point-of-sale) equipment, and PBX (private branch exchange) systems;
converting the recognized speech into one or more text data packets at the customer premise equipment;
transmitting the text data packets from the customer premise equipment to a host; and
receiving a plurality of information from the host based on the speech of the user;
wherein transmitting the text data packets from the customer premise equipment to a host comprises encrypting the text data packets before transmission to the host.

15. A system for remote speech recognition, the system comprising:
one or more telephones remote from a host and operable to interface with the host;
a speech engine remotely located from the host, the speech engine operable to recognize a plurality of speech from a user of the telephone and convert the recognized speech into one or more text data packets; and
a communication engine associated with the speech engine, the communication engine operable to transmit the text data packets from the telephone to the host and further operable to encrypt the text data packets before transmitting the text data packets to the host from the telephone.

16. The system of claim 15 wherein the host comprises a computer located in a call center.

17. The system of claim 15 wherein the speech engine is disposed within the telephone.

18. The system of claim 15 wherein the information received from the host comprises one or more grammars.

19. The system of claim 15 wherein the communication engine transmits the text data packets to the host and receives the information from the host utilizing voice over Internet Protocol.

20. The system of claim 15 wherein the speech engine is further operable to recognize and verify the identity of the user of the telephone.

21. The system of claim 20 wherein the communication engine is operable to transmit to the host a plurality of user information once the identity of the user has been verified.

22. The system of claim 15 wherein the host is further operable to route a call from the telephone based on a plurality of user information.

23. The system of claim 15 wherein the host is further operable to download to the telephone a menu hierarchy.

24. The system of claim 15 wherein the user interacts with the telephone in place of the host.

25. The system of claim 15 wherein the speech engine is further operable to translate a user language into a host language.

26. The system of claim 15 wherein the speech engine is further operable to be customized based on one or more characteristics of the user.

27. The system of claim 15 wherein the host is further operable to receive the text data packets and route the text data packets.

28. The system of claim 15 wherein the host comprises an interactive voice response unit.

29. A system for remote speech recognition, the system comprising:
one or more telephones remote from a host and operable to interface with the host;
a speech engine remotely located from the host, the speech engine operable to recognize a plurality of speech from a user of the telephone and convert the recognized speech into one or more text data packets; and a communication engine associated with the speech engine, the communication engine operable to transmit the text data packets from the telephone to the host;

wherein the host is further operable to speculate as to a purpose for the telephone accessing the host based on a plurality of user information.

* * * * *